United States Patent [19]

Tsumura et al.

[11] Patent Number: 5,174,792
[45] Date of Patent: Dec. 29, 1992

[54] MIXTURES OF MONOAZO DYES: DICYANO-NITROBENZENE AZO COMPOUNDS

[75] Inventors: Hirotsugu Tsumura, Kishiwda, Japan; Ulrich Bühler, Alzenau, Fed. Rep. of Germany; Reinhard Kühn, Frankfurt, Fed. Rep. of Germany; Margareta Boos, Hattersheim, Fed. Rep. of Germany

[73] Assignee: Cassella Aktiengesellschaft, Frankfurt am Main, Fed. Rep. of Germany

[21] Appl. No.: 743,898

[22] Filed: Aug. 12, 1991

[30] Foreign Application Priority Data

Aug. 24, 1990 [DE] Fed. Rep. of Germany ....... 4026747

[51] Int. Cl.⁵ ............... C09B 29/08; C09B 67/22; D06P 1/18
[52] U.S. Cl. .................................. 8/639; 8/524; 8/527; 8/532; 8/533; 8/662; 8/696; 8/921; 8/922; 8/924
[58] Field of Search ............................ 8/639

[56] References Cited

U.S. PATENT DOCUMENTS

| | | | |
|---|---|---|---|
| 3,954,395 | 5/1976 | Leverenz | 8/639 |
| 4,728,338 | 3/1988 | Henzi | 8/639 |
| 4,802,889 | 2/1989 | Buhler et al. | 8/639 |
| 4,985,043 | 1/1991 | Buhler et al. | 8/639 |

FOREIGN PATENT DOCUMENTS 63-189465 8/1988 Japan .
2108141 11/1983 United Kingdom .

Primary Examiner—A. Lionel Clingman
Attorney, Agent, or Firm—Connolly and Hutz

[57] ABSTRACT

The invention relates to mixtures of monoazo dyes, which are characterized in that they consist of one or more dyes of the general formula I

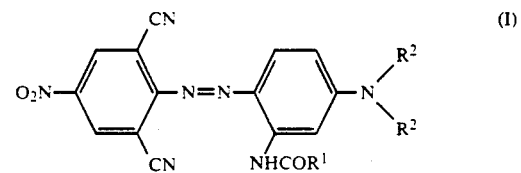

and one or more dyes of the general formula II

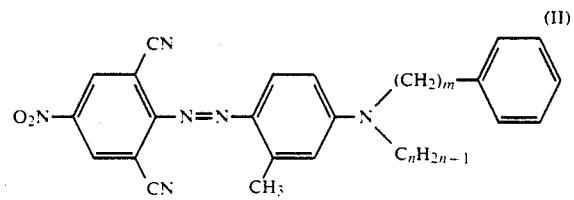

where
$R^1$ is methyl, ethyl, n-propyl or i-propyl,
$R^2$ is ethyl or n-propyl,
m is 2 or 3 and
n is 1 or 2, with the proviso that $m+n$ is 4, processes for preparing same and the use thereof for dyeing and printing hydrophobic fibre materials and blends thereof with natural fibre materials.

8 Claims, No Drawings

MIXTURES OF MONOAZO DYES: DICYANO-NITROBENZENE AZO COMPOUNDS

The invention relates to mixtures of monoazo dyes, which are characterised in that they contain one or more dyes of the general formula I

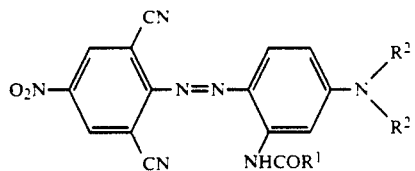

and one or more dyes of the general formula II

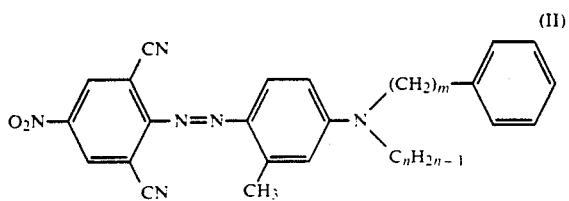

where
$R^1$ is methyl, ethyl, n-propyl or i-propyl,
$R^2$ is ethyl or n-propyl,
m is 2 or 3 and
n is 1 or 2, with the proviso that m+n is 4.

The invention also relates to processes for preparing the dye mixtures of the present invention and to the use thereof for dyeing and printing hydrophobic fibre materials and their blends with natural fibre materials.

Mixtures similar to the mixtures of the present invention are already known and described for example in GB-2,108,141.

It has now been found, surprisingly, that the mixtures of the present invention have significantly improved dyeing properties compared with the individual dyes and compared with the mixtures of GB-2,108,141.

The dye mixtures of the present invention consist of one or more dyes of the general formula I and one or more dyes of the general formula II. Preference is given to dye mixtures of the present invention which contain one or two dyes of the general formula I and a single dye of the general formula II.

Preference is given to mixtures which contain dyes of the general formula I where $R^1$ is methyl or ethyl or in particular n-propyl and $R^2$ is ethyl. Preferred mixtures also include those which contain only two dyes of the general formula I and one dye of the general formula II where $R^1$ denotes methyl in one and n-propyl in the other and $R^2$ denotes ethyl in both dyestuffs of the formula I or where $R^1$ denotes methyl in both and $R^2$ ethyl in one and n-propyl in the other dyestuff of the Formula I.

In the dye mixtures of the present invention, the ratio of the various dyes of the general formulae I and II can vary within relatively wide limits. In general, the minimum weight proportion of one component is 10% and the maximum proportion is 90%. by weight based on the total weight of the dye components wherein the total weight proportions of all dye components is 100%. In dye mixtures which contain only one dye each of the general formulae I and II, the mixing ratio is preferably within the range from 70/30 to 30/70; that is, the weight proportion of a dye is from 30 to 70% by weight based on the total weight of the dye components.

The individual dyes of the general formulae I and II are known and described for example in DE Patent 1,794,402, EP-36,512 and Japanese Patent Application JP-63,189,465.

The dye mixtures of the present invention can be prepared by various methods, for example by mixing the separately prepared and separately finished individual dyes. This mixing process is effected in suitable mixers, for example tumble mixers, or in suitable mills, for example ball and sand mills. However, separately finished individual dyes can also be mixed by stirring into dyeing liquors.

Preferably, the mixtures of the present invention are obtained by conjoint finishing of the separately prepared individual components.

This conjoint finishing is characterised in that a dye mixture of at least one dye each of the general formulae I and II is milled in the presence of dispersants in suitable mills, for example ball or sand mills, and, if a pulverulent dye form is to be prepared, is subsequently spray-dried.

Suitable dispersants are for example anionic or nonionic dispersants, which may also be used together. Anionic dispersants are for example condensation products of aromatic sulphonic acids and formaldehyde, in particular condensation products of alkylnaphthalene sulphonic acids and formaldehyde, condensation products of substituted or unsubstituted phenol with formaldehyde and sodium bisulphite, alkali metal salts of condensation products of substituted or unsubstituted phenol, naphthalene- or naphthol-sulphonic acids, formaldehyde and sodium bisulphite, alkali metal salts of condensation products of substituted or unsubstituted phenolsulphonic acids, formaldehyde and urea and also alkali metal salts of ligninsulphonic acids; alkane- or alkylarene-sulphonates, and also alkylaryl polyglycol ether sulphates. Nonionic dispersants or emulsifiers are for example reaction products of alkylene oxides, for example ethylene oxide or propylene oxide, with alkylatable compounds, for example fatty alcohols, fatty amines, fatty acids, phenols, alkylphenols, arylalkylphenols, arylalkylarylphenols and carboxamides, for example addition products of from 5 to 10 ethylene oxide units with $C_8$–$C_{10}$-alkylphenols.

The milling takes place at temperatures between 10° and 90° C., preferably at from 30° to 60° C. In the conjoint finishing of separately prepared, individual components, conjoint milling at temperatures above 30° C. is advantageous. In the course of milling, the dye particles are mechanically comminuted to such an extent as to obtain an optimum specific surface area and as to minimise the sedimentation of the dye. The particle size of the dyes lies in general between 0.5 and 5 μm, preferably at about 1 μm.

It is advantageous to subject the separately prepared individual components of the dye mixture to a conjoint thermal treatment before the conjoint milling. This thermal treatment is characterised in that the individual components of the dye mixture are heated under atmospheric or superatmospheric pressure in water for half an hour to several hours at from 50° to 150° C., preferably at from 90° to 130° C., and cooled back down again. This heating advantageously takes place in the presence of one or more dispersants or an organic solvent. Such solvents are for example methanol, ethanol, dimethylformamide or dimethyl sulphoxide, but preferably only sparingly water-soluble solvents such as toluene, chlorobenzene, 1,2-dichlorobenzene or butyl acetate. These solvents are distilled off again after the thermal treatment.

A preferred pretreatment of the individual components of the dye mixture prior to the conjoint milling is the conjoint dissolving of the individual components in an organic solvent or solvent mixture with subsequent crystallisation or precipitation, and isolation, for example by filtration and removal of solvent residues, for example by washing.

The dye dispersions thus obtained can be used with great advantage for making up print pastes and dyeing liquors. They offer particular advantages for example in continuous processes where the dye concentration of the dyeing liquors must be kept constant by continuous feeding of dye into the running apparatus.

Powder formulations are preferred for certain applications. These powders contain the dye, dispersant and other auxiliaries, for example wetting, oxidising, preserving and dustproofing agents.

A preferred method of preparing pulverulent dye preparations consists in removing the liquid from the above-described liquid dye dispersions, for example by vacuum drying, freeze drying, by drying on drum dryers, but preferably by spray drying.

The dye contents of the liquid dye formulations range from 20 to 40%, and the dispersant contents from about 20 to 40%. In the case of powder formulations the dye contents range from 20 to 60% and the dispersant contents from 40 to 80%. For economic reasons the dye content is usually not less than 20%.

The dye mixtures of the present invention as such or else mixed with other disperse dyes are highly suitable for dyeing and printing hydrophobic synthetic fibre materials and blends thereof with natural fibre materials. Surprisingly, they are superior to the individual dyes in respect of dyeing properties and colouristic fastness properties, for example thermomigration, fastness to dry heat setting and pleating, water, washing and rub fastness, in particular in build-up and exhaustion properties and in levelling power. Moreover, the dye mixtures of the present invention still give very strong dyeings with excellent bath exhaustion even if the dyeing temperatures are lowered and the dyeing time is shortened.

Suitable hydrophobic synthetic materials are for example cellulose-2,5- acetate, cellulose triacetate, polyamides and particularly polyesters, for example polyethylene terephthalate. Blends thereof with natural fibre materials are for example with cotton, regenerated cellulose fibres or wool.

The invention is further illustrated by the following examples:

EXAMPLE 1

14.7 g of the dye of the formula III

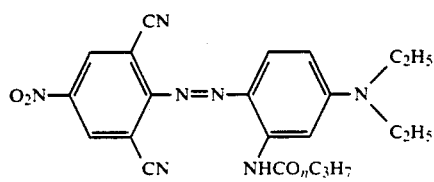

14.7 g of the dye of the formula IV

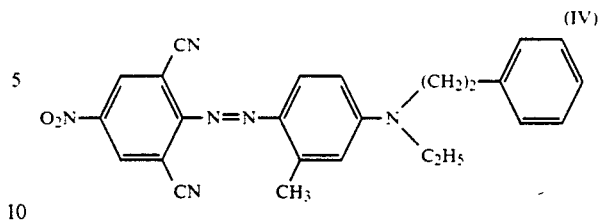

are conjointly homogenised with 227.6 g of water, 86.8 g of a higher molecular weight ligninsulphonate and 6.3 g of an aryl polyglycol ether using a dissolver disc and the pH is brought to 8.0 with 2.6 ml of 50% strength acetic acid. This batch is then milled in a water-cooled bead mill to a fineness of $<5\mu$, and the mill-base thus obtained is screened to separate off milling media and then dried with a spray dryer.

1.25 g of the dye thus obtained are dispersed in 2000 g of water. The dispersion is admixed with 4 g of ammonium sulphate, 2 g of commercial dispersant based on a condensation product of sodium naphthalenesulphonate and formaldehyde and 2 g of a condensation product of m-cresol, formaldehyde and sodium sulphite and brought to pH 5.5 with acetic acid. The dyeing liquor thus obtained is entered with 100 g of a textured polyester fabric based on polyethylene terephthalate, which is dyed therein at 125° C. for ½ hour. Subsequent rinsing, reduction clearing with 0.2% strength sodium dithionite solution at from 70° to 80° C. for 15 minutes, rinsing and drying gives a strong blue dyeing having excellent colouristic properties.

If to test the exhaustion the dye bath is subsequently entered with 100 g of a textured polyester fabric based on polyethylene terephthalate for a dyeing at 135° C. for 1 hour and the dyeing is subsequently treated in the same way as the actual dyeing, a virtually colourless dyeing is obtained.

EXAMPLE 2

10 g of the dye of the formula V

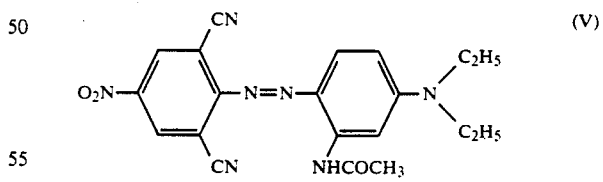

5 g of the dye of the formula VI

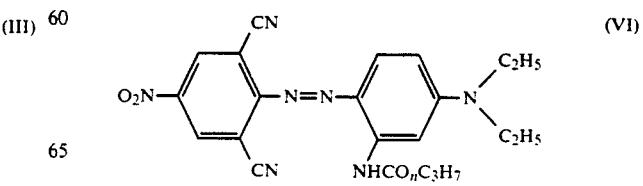

and 14.4 g of the dye of the formula VII

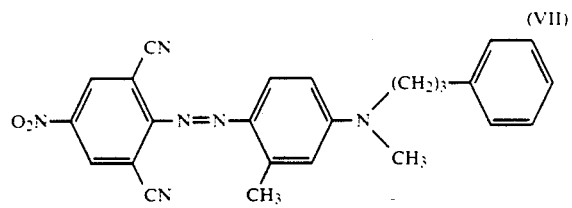

are converted into a powder preparation and dyed as described in Example 1. Again a strong blue dyeing is obtained with excellent colouristic fastness properties and almost complete bath exhaustion.

EXAMPLE 3

If in Example 1 the 14.7 g of the dye of the formula III are replaced by the corresponding amount of the dye of the formula V

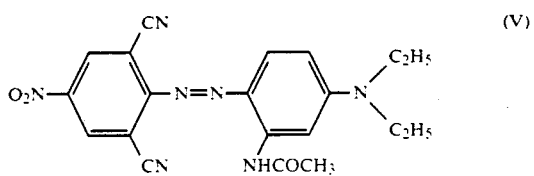

and the procedure is otherwise as described in Example 1, again a strong blue dyeing is obtained with excellent colouristic properties and an only slightly coloured exhaustion test dyeing.

The table below shows further dye mixtures of the present invention with the meanings for $R^1$ and $R^2$ and m and n and the weight ratio of the individual dyes, which are preparable as described above and which likewise produce strong blue dyeings and prints on polyester materials with again very good colouristic properties.

TABLE

| Example | $R^1$ | $R^2$ | m | n | Mixing ratio |
|---|---|---|---|---|---|
| 4 | $C_2H_5$ | $C_2H_5$ | — | — | 40 |
|  | — | — | 2 | 2 | 60 |
| 5 | $CH_3$ | $nC_3H_7$ | — | — | 65 |
|  | — | — | 2 | 2 | 35 |
| 6 | $C_2H_5$ | $nC_3H_7$ | — | — | 30 |
|  | — | — | 2 | 2 | 70 |
| 7 | $nC_3H_7$ | $nC_3H_7$ | — | — | 50 |
|  | — | — | 2 | 2 | 50 |
| 8 | $iC_3H_7$ | $C_2H_5$ | — | — | 33⅓ |
|  | — | — | 2 | 2 | 66⅔ |
| 9 | $CH_3$ | $C_2H_5$ | — | — | 50 |
|  | — | — | 3 | 1 | 50 |
| 10 | $CH_3$ | $nC_3H_7$ | — | — | 20 |
|  | — | — | 3 | 1 | 80 |
| 11 | $C_2H_5$ | $C_2H_5$ | — | — | 45 |
|  | — | — | 3 | 1 | 55 |
| 12 | $C_2H_5$ | $nC_3H_7$ | — | — | 90 |
|  | — | — | 3 | 1 | 10 |
| 13 | $nC_3H_7$ | $C_2H_5$ | — | — | 55 |
|  | — | — | 3 | 1 | 45 |
| 14 | $iC_3H_7$ | $C_2H_5$ | — | — | 35 |
|  | — | — | 3 | 1 | 65 |
| 15 | $iC_3H_7$ | $nC_3H_7$ | — | — | 25 |
|  | — | — | 3 | 1 | 75 |
| 16 | $CH_3$ | $C_2H_5$ | — | — | 25 |
|  | $nC_3H_7$ | $C_2H_5$ | — | — | 25 |
|  | — | — | 2 | 2 | 50 |
| 17 | $CH_3$ | $C_2H_5$ | — | — | 35 |
|  | $nC_3H_7$ | $C_2H_5$ | — | — | 15 |
|  | — | — | 2 | 2 | 50 |
| 18 | $CH_3$ | $C_2H_5$ | — | — | 25 |

TABLE-continued

| Example | $R^1$ | $R^2$ | m | n | Mixing ratio |
|---|---|---|---|---|---|
|  | $CH_3$ | $nC_3H_7$ | — | — | 25 |
|  | — | — | 2 | 2 | 50 |
| 19 | $CH_3$ | $nC_3H_7$ | — | — | 20 |
|  | $nC_3H_7$ | $C_2H_5$ | — | — | 40 |
|  | — | — | 2 | 2 | 40 |
| 20 | $CH_3$ | $C_2H_5$ | — | — | 35 |
|  | $C_2H_5$ | $C_2H_5$ | — | — | 40 |
|  | — | — | 2 | 2 | 25 |
| 21 | $C_2H_5$ | $C_2H_5$ | — | — | 10 |
|  | $nC_3H_7$ | $C_2H_5$ | — | — | 60 |
|  | — | — | 2 | 2 | 30 |
| 22 | $CH_3$ | $C_2H_5$ | — | — | 33⅓ |
|  | $iC_3H_7$ | $C_2H_5$ | — | — | 33⅓ |
|  | — | — | 2 | 2 | 33⅓ |
| 23 | $iC_3H_7$ | $C_2H_5$ | — | — | 5 |
|  | $iC_3H_7$ | $nC_3H_7$ | — | — | 55 |
|  | — | — | 2 | 2 | 40 |
| 24 | $nC_3H_7$ | $C_2H_5$ | — | — | 50 |
|  | $iC_3H_7$ | $C_2H_5$ | — | — | 10 |
|  | — | — | 2 | 2 | 40 |
| 25 | $CH_3$ | $C_2H_5$ | — | — | 25 |
|  | $CH_3$ | $nC_3H_7$ | — | — | 5 |
|  | $nC_3H_7$ | $C_2H_5$ | — | — | 35 |
|  | — | — | 2 | 2 | 35 |
| 26 | $CH_3$ | $C_2H_5$ | — | — | 40 |
|  | — | — | 2 | 2 | 15 |
|  | — | — | 3 | 1 | 45 |
| 27 | $nC_3H_7$ | $C_2H_5$ | — | — | 30 |
|  | — | — | 2 | 2 | 60 |
|  | — | — | 3 | 1 | 10 |
| 28 | $CH_3$ | $C_2H_5$ | — | — | 50 |
|  | — | — | 3 | 1 | 50 |
| 29 | $CH_3$ | $nC_3H_7$ | — | — | 70 |
|  | — | — | 3 | 1 | 30 |
| 30 | $C_2H_5$ | $C_2H_5$ | — | — | 30 |
|  | — | — | 3 | 1 | 70 |
| 31 | $C_2H_5$ | $nC_3H_7$ | — | — | 40 |
|  | — | — | 3 | 1 | 60 |
| 32 | $nC_3H_7$ | $C_2H_5$ | — | — | 80 |
|  | — | — | 3 | 1 | 20 |
| 33 | $nC_3H_7$ | $C_2H_5$ | — | — | 50 |
|  | — | — | 3 | 1 | 50 |
| 34 | $iC_3H_7$ | $C_2H_5$ | — | — | 45 |
|  | — | — | 3 | 1 | 55 |
| 35 | $iC_3H_7$ | $nC_3H_7$ | — | — | 30 |
|  | — | — | 3 | 1 | 70 |
| 36 | $CH_3$ | $C_2H_5$ | — | — | 25 |
|  | $CH_3$ | $nC_3H_7$ | — | — | 25 |
|  | — | — | 3 | 1 | 50 |
| 37 | $CH_3$ | $nC_3H_7$ | — | — | 50 |
|  | $C_2H_5$ | $C_2H_5$ | — | — | 10 |
|  | — | — | 3 | 1 | 40 |
| 38 | $CH_3$ | $C_2H_5$ | — | — | 33⅓ |
|  | $nC_3H_7$ | $C_2H_5$ | — | — | 33⅓ |
|  | — | — | 3 | 1 | 33⅓ |
| 39 | $CH_3$ | $C_2H_5$ | — | — | 40 |
|  | $iC_3H_7$ | $C_2H_5$ | — | — | 45 |
|  | — | — | 3 | 1 | 15 |
| 40 | $CH_3$ | $nC_3H_7$ | — | — | 10 |
|  | $nC_3H_7$ | $C_2H_5$ | — | — | 30 |
|  | — | — | 3 | 1 | 60 |
| 41 | $CH_3$ | $C_2H_5$ | — | — | 70 |
|  | — | — | 3 | 1 | 30 |
| 42 | $CH_3$ | $C_2H_5$ | — | — | 30 |
|  | — | — | 3 | 1 | 70 |

We claim:

1. Mixtures of monoazo dyes comprising one or more dyes of the general formula I

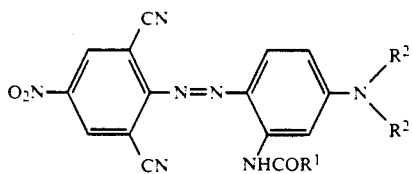

and one or more dyes of the general formula II

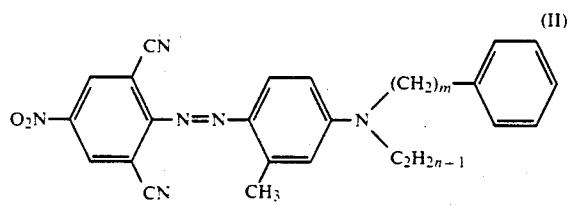

where
$R^1$ is methyl, ethyl, n-propyl or i-propyl,
$R^2$ is ethyl or n-propyl,
m is 2 or 3 and
n is 1 or 2, with the proviso that m+n is 4.

2. Dye mixture according to claim 1 comprising one or two dyes each of the general formulae I and II.

3. Dye mixture according to claim 1 wherein the weight proportion of each dye component is from 10 to 90% by weight based on the total weight of the dye components wherein the total weight proportions of all the dye components is 100%.

4. Dye mixture according to claim 3 comprising only one dye each of the general formulae I and II wherein the weight proportion of the dye components is from 30 to 70% by weight based on the total weight of the dye components.

5. Dye mixtures according to claim 1 containing a dye of the general formula I wherein $R^1$ is n-propyl.

6. Dye mixture according to claim 1 containing a dye of the general formula I wherein $R^2$ is ethyl.

7. Dye mixture according to claim 1 containing two dyes of the general formula I and one dye of the general formula II, where $R^1$ denotes methyl in one and n-propyl in the other and $R^2$ denotes ethyl in both dyestuffs of the formula I or where $R^1$ denotes methyl in both and $R^2$ ethyl in one and n-propyl in the other dyestuff of the formula I.

8. A process for dyeing and printing hydrophobic fibre materials and blends thereof with natural fibre materials using the dye mixtures of claim 1.

* * * * *